United States Patent [19]
Chen et al.

[11] Patent Number: 5,822,127
[45] Date of Patent: Oct. 13, 1998

[54] LOW-COST LIGHT-WEIGHT HEAD-MOUNTED VIRTUAL-IMAGE PROJECTION DISPLAY WITH LOW MOMENTS OF INERTIA AND LOW CENTER OF GRAVITY

[75] Inventors: Chungte W. Chen, Irvine; Uzi Efron, Los Angeles; Arthur N. Chester, Malibu, all of Calif.

[73] Assignee: Hughes Electronics, El Segundo, Calif.

[21] Appl. No.: 826,856

[22] Filed: Apr. 11, 1997

Related U.S. Application Data

[63] Continuation of Ser. No. 441,506, May 15, 1995, abandoned.

[51] Int. Cl.$^6$ .................................................. G02B 27/14
[52] U.S. Cl. ............................................. 359/631; 359/633
[58] Field of Search ................................... 359/630, 633, 359/631

[56] References Cited

U.S. PATENT DOCUMENTS

| | | |
|---|---|---|
| 3,940,204 | 2/1976 | Withrington . |
| 4,603,398 | 7/1986 | Bocker . |
| 4,859,030 | 8/1989 | Rotier ........................................ 359/631 |
| 4,878,046 | 10/1989 | Smith ........................................ 359/630 |
| 4,961,626 | 10/1990 | Fournier ................................... 359/630 |
| 5,000,544 | 3/1991 | Staveley . |
| 5,200,827 | 4/1993 | Hanson . |

(List continued on next page.)

FOREIGN PATENT DOCUMENTS

| | | |
|---|---|---|
| A0077193 | 4/1983 | European Pat. Off. . |
| A0252200 | 1/1988 | European Pat. Off. . |
| A0301473 | 2/1989 | European Pat. Off. . |
| A0365406 | 4/1990 | European Pat. Off. . |
| A0408344 | 1/1991 | European Pat. Off. . |
| A0246497 | 5/1991 | European Pat. Off. . |
| A0526067 | 2/1993 | European Pat. Off. . |

(List continued on next page.)

OTHER PUBLICATIONS

IEEE Virtual Reality Annual International Symposium; 18–22 Sep. 1993; Seattle Washington; pp. 234–245; XP000457693; Paul K. Manhart; "A Compact, Solid Schmidt Optical Relay for Helmet Mounted Displays"; p. 237, Para. 2; Fig. 3.

Proceedings SPIE–The Internernational Society for Optical Engineering, Helmet Mounted Displays; vol. 1116; 28–29 Mar. 1989; Orlando, Florida; pp. 19–26; XP000575410; J.G. Drossler and D.J. Rotier; "Tilted Cat Helmet Mounted Display"; Cited in the Application; see pp. 21, 22; Display Design; Fig. 5.

(List continued on next page.)

*Primary Examiner*—Georgia Y. Epps
*Assistant Examiner*—Evelyn A. Lester
*Attorney, Agent, or Firm*—Leonard A. Alkov; William C. Schubert; Glenn H. Lenzen, Jr.

[57] ABSTRACT

A head-mounted display device (10) offers light weight, a low center of gravity, and low moments of inertia about the azimuthal and elevational axes of head movement. The display device (10) employs an angulated beam splitter mirror (16) disposed between a user's (22) eye (20) and an inner combiner surface (18a) of a visor (28). A projector (36) is carried laterally of the user's eye with a low center of gravity and a position close to the horizontal axis of elevational movement of the head. This projector (36) includes an image source (12) and an compact light-weight relay optics module (14) along with a projection fold mirror (30) disposed at eye level and laterally of the beam splitter mirror (16) to project image light to the beam splitter mirror (16). The beam splitter mirror (16) reflects the light onto the inner surface (18a) of the combiner (18) for reflection back through the beam splitter mirror (16) and to the user's eye (20). Alternative embodiments provide for color correction, or for monochrome image projection at even lighter weight. An alternative embodiment provides for both color correction and a weight nearly as light as the monochrome version by use of diffractive lenses in the relay optics module.

3 Claims, 5 Drawing Sheets

U.S. PATENT DOCUMENTS

| | | | |
|---|---|---|---|
| 5,299,063 | 3/1994 | Fritz | 359/631 |
| 5,436,765 | 7/1995 | Togino | 359/631 |
| 5,506,705 | 4/1996 | Yamamoto | 359/40 |
| 5,537,253 | 7/1996 | Cox et al. | 259/630 |

FOREIGN PATENT DOCUMENTS

| | | |
|---|---|---|
| A0583116 | 2/1994 | European Pat. Off. . |
| A0599759 | 6/1994 | European Pat. Off. . |
| A1575798 | 7/1969 | France . |
| A2238627 | 6/1991 | United Kingdom . |
| A2239576 | 7/1991 | United Kingdom . |
| WOA9418596 | 8/1994 | WIPO . |
| WOA9510062 | 4/1995 | WIPO . |

OTHER PUBLICATIONS

Flug Revue; No. 3; Mar. 1993; Stuttgart; DE, pp. 82–85; XP000391344; Heinrich Hemker; "Datenspiegel" see p. 85, Down Left Fig.

Patent Abstracts of Japan; vol. 15; No. 59 (P–1165) & JP,A,02287586 (Horiuchi); 27 Nov. 1990; See Abstract; Figure.

Displays; No. 2; May 1994; Oxford, GB, pp. 106–109; XP000511188; Pinhas Gilboa and Sasson Abraham; "Third–Generation Dash Helmet"; see Abstract; see p. 107; Titled Spherical Combiner.

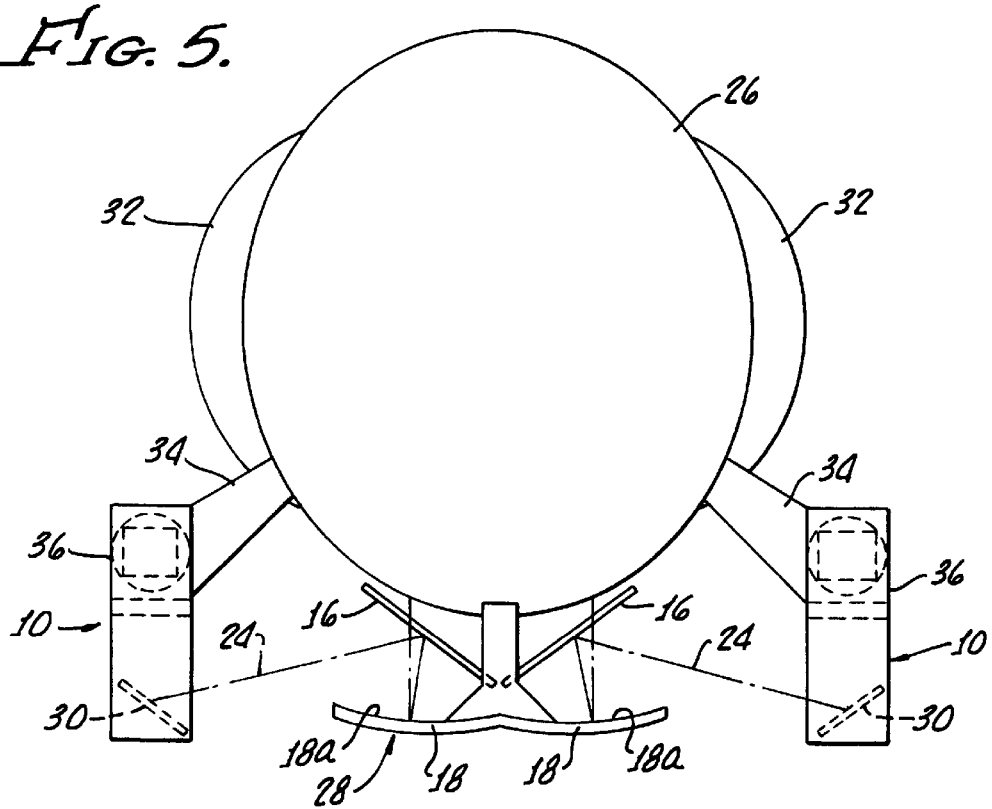
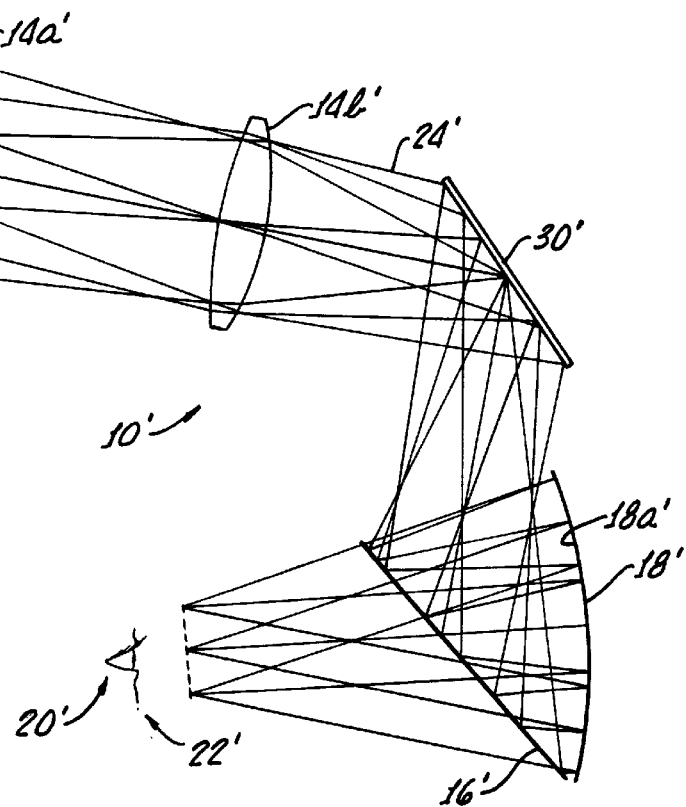

LOW-COST LIGHT-WEIGHT HEAD-MOUNTED VIRTUAL-IMAGE PROJECTION DISPLAY WITH LOW MOMENTS OF INERTIA AND LOW CENTER OF GRAVITY

This is a continuation of U.S. Pat. application Ser. No. 08/441,506, filed on May 15, 1996, now abandoned.

BACKGROUND OF THE INVENTION

1. Field of the Invention

The present invention is in the field of image projection displays. More particularly, the present invention relates to image projection displays which are mounted to a helmet or other headgear worn by a user. The head gear carries a visor in front of the user's eyes. In order for the user to view the distance field the visor may be transparent. In this case, the user of the display may look through the transparent visor to see objects in the distance visual field. Projected light is also reflected from an inner surface of this visor to provide the user with a virtual image focused at infinity and superimposed upon the view seen through the visor. If the visor is not transparent, the user may see only the projected image in the distant field. This embodiment of the invention would be used for computerized virtual reality projection, for example. This type of display has civilian, military, industrial, medical, and other applications.

2. Related Technology

Head-mounted image projection displays, including headgear-mounted displays (HMD's), and including those displays which use the visor of a helmet as part of the display (i.e., a helmet visor display, or HVD), are well known in the art. Such head-mounted display systems provide a clear advantage to the user over panel-mounted or other remotely-positioned displays, such as projection heads-up displays (HUD's), for example. One of these advantages is that the image provided by a HMD moves with the user and may be viewed while it is superimposed on the user's view of the surroundings. Thus, even when the user's visual attention is directed other than toward an instrument panel, for example, the user can visually monitor important information which is presented visually. Another advantage is that the user need not continually shift visual focus from the distant field of the surroundings to the near field of an instrument panel, for example, in order to check the conditions of a vehicle or other such information which is not in the distant visual field. While the HUD type of displays have this same advantage, they can be viewed only while looking through the combiner or windscreen of an aircraft, for example. This freedom from the necessity of changing visual focus is both important for allowing the user to maintain constant visual contact with items in the far visual field, for example, but also because it reduces visual fatigue. That is, extended periods of time such as occurs in long-distance aircraft flight, during which the aircraft pilot is of necessity forced to continually shift visual focus from the far field out through an aircraft windshield to the near visual field at the aircraft instrument panel, can lead to severe visual fatigue. Aircraft pilots in such circumstances can experience a drastically reduced performance and reduced ability to visually detect and respond to threats.

Typically, a conventional HMD system includes (1) an image source; (2) an optical relay module; and (3) a projection surface (known as a combiner), through which the user views the outside world and upon which is projected the image generated by the image source and relayed by the system's optical relay module. The display apparatus may be secured relative to the user's head by use of a cap, head gear, face mask, or by being associated with a helmet which the user wears, for example.

Conventional head-mounted display systems have employed a combiner that is either integral with the visor of the helmet or separated from the visor as an independent screen placed inside the visor. These design alternatives have both led to helmets of appreciable size, weight, high center of gravity (i.e., top heavy), high moments of inertia about one or both of the azimuthal or elevational axis of head tilting, great complexity, and high cost. Many of these conventional head-mounted displays have suffered from either low optical efficiency because of the use of a beam splitter type of on-axis projection system, or off-axis projection aberrations such as keystoning and asymmetry aberrations because of use of an off-axis projection system Particularly, in order to improve the packaging effectiveness of a head-mounted display with respect to the structure of the human head, attempts have been made to decrease the overall length and moment of inertia of the system by fixing the optical axis of the relay module at some acute angle with respect to the optical axis of the combiner. This arrangement is known as "off-axis" projection of the image. The visor may still be used as a combiner by projecting the image onto the visor inner surface for reflection to the user, but off-axis projection causes various distortions of the image as seen by the user. Among these aberrations caused by the off-axis bending angle are the asymmetric aberrations of axial and bimodal astigmatism and axial coma as well as keystone distortion of the image provided to the user.

An example of a typical helmet visor display system utilizing off-axis projection is disclosed in U.S. Pat. No. 3,940,204 issued Feb. 24, 1976 to R. J. Withrington. The Withrington patent is believed to describe a holographic lens as a combiner glass, operating at a large off-axis angle. Aberrations inherent in an off-axis holographic lens are minimized by constructing the lens with aberrated wave fronts and by tilting and/or de-centering elements in an optical relay set in order to compensate for astigmatism and axial coma in the holographic lens.

Such a holographic combiner is difficult to fabricate, and the large asymmetric aberrations introduced due to the large bending angle limits the usable field of view (FOV). Correcting for the aberrations increases the size and complexity of the relay optics, adding cost and maintenance concerns, while the added weight is always objectionable to the users of such systems, who would prefer a system having much smaller moments of inertia. Also, this type of system suffers from chromatic aberrations.

Recognizing the disadvantages of the holographic lens approach and complex relay lens schemes to correct image distortion problems inherent in off-axis projection, it has been proposed to modify a conventional on-axis system by incorporating a beam splitter positioned between the combiner and the user's eye. The beam splitter improvement to on-axis orientation of the relay module was suggested, for example, by Droessler and Rotier in their SPIE paper entitled "Helmet Mounted Visual Displays", *The Society of Photo-Optical Instrumentation Engineers*, p19–29, Vol 1116, (1989). The beam splitter is used to keep the optical axis of the relay lenses co-aligned with the optical axis of the combiner.

With a beam splitter in the system, there is no inherent keystone distortion nor any asymmetric aberrations. HMD aberrations are similar to any axially symmetric optical system, and thus are much easier to correct.

However, use of a beam splitter may cost the loss of as much as fifty percent of the projected light between the beam splitter and combiner, so that overall efficiency of the image projection system is poor (i.e., in the 25% to 30% range). Consequently, a brighter image source must be used, which is frequently larger, heavier, and more expensive. This larger and heavier image source has the disadvantage of increasing all of the size, weight, and moment of inertia of the system. In addition, the usable field of view (FOV) is limited by the physical open area below the combiner and the beam splitter, so that the radius of the combiner must be shortened to expand the FOV, relaying the pupil closer to the combiner (away from the neck of the user), thereby increasing the moment of inertia of the system.

An example of a conventional head-mounted display with a beam splitter is seen in U.S. Pat. No. 5,200,827 issued Apr. 6, 1993, to C. M. Hanson, et al. The Hanson patent is believed to disclose a head-mounted display in which the visor/combiner, or visor with separate combiner screen, is integrated with an image source and relay optics into a unit which may be attached to or used in association with a conventional infantry helmet. The head-mounted display taught by the Hanson patent suffers from many of the size, weight, high center of gravity, high moment of inertia, and complexity limitations associated with conventional head-mounted displays as discussed above.

Another example of a known beam-splitter type of HMD is seen in U.S. Pat. No. 5,000,544 issued Mar. 19, 1991 to C. B. Stavely. According to the Stavely patent, a combiner requires a tuned optical coating reflective of light in the wavelength band of the display source. Suspension of both the image source and the relay optics in front of the user's face causes both a high center of gravity and an undesirable forward shifting of the helmet center of gravity, along with many of the other previously enumerated shortcomings of a conventional beam splitter systems.

SUMMARY OF THE INVENTION

Accordingly, it is an object of the present invention to provide a helmet mounted display that overcomes one or more of the above-mentioned deficiencies of conventional image-projection displays of both the off-axis and on-axis (beam splitter) varieties.

It is another object of the present invention to provide a low cost, light weight, low moments of inertia, low center of gravity helmet-mounted display system that presents high quality virtual projected images to a user.

Accordingly, the present invention provides an image-projection display system carried upon a headgear worn by a user, the display system having improved image quality and a low center of gravity on the user's head with low moments of inertia about both a vertical azimuthal axis and a horizontal elevational axis, this image display system including an image source for providing an image to be projected to the user, the image source providing light for forming the image; a relay optics module receiving the light from the image source and having lenses for projecting the light; a beam splitter disposed in front of an eye of the user for receiving the projected light from the relay optics module and reflecting this light away from the eye of the user; a combiner disposed in front of both the user's eye and the beam splitter and upon which the light reflected from the beam splitter is projected to be reflected from the combiner back through the beam splitter to the user's eye; the image source and at least part of the relay optics module being disposed to one side of the user's head and below the level of the user's eye.

Additional objects and advantages of the present invention will become apparent from a reading of the following detailed description of a single preferred embodiment of the present invention, taken in conjunction with the appended drawing Figures, which are described briefly below:

BRIEF DESCRIPTION OF THE DRAWING FIGURES

FIG. 1 provides a highly schematic representation of physical components and an optical ray-tracing diagram for a head-mounted display according to the present invention;

FIG. 2 provides a side elevation view of a user wearing a helmet upon which is carried a visor and a head-mounted display system according to the present invention, with the physical components of the display system still being shown schematically at a higher level of development than that of FIG. 1, but still incompletely developed, and with a projected image ray-tracing included;

FIGS. 3–5 show respective side elevation, front elevation, and plan views of the user with helmet and a physical embodiment of the display system seen in FIG. 2, FIG. 3 is shown with parts broken away and removed for clarity of illustration;

FIG. 6 is a schematic representation (similar to FIG. 1) of an alternative embodiment of a head-mounted display according to the invention, with a simplified and even lighter weight optical relay system;

Figure 7:
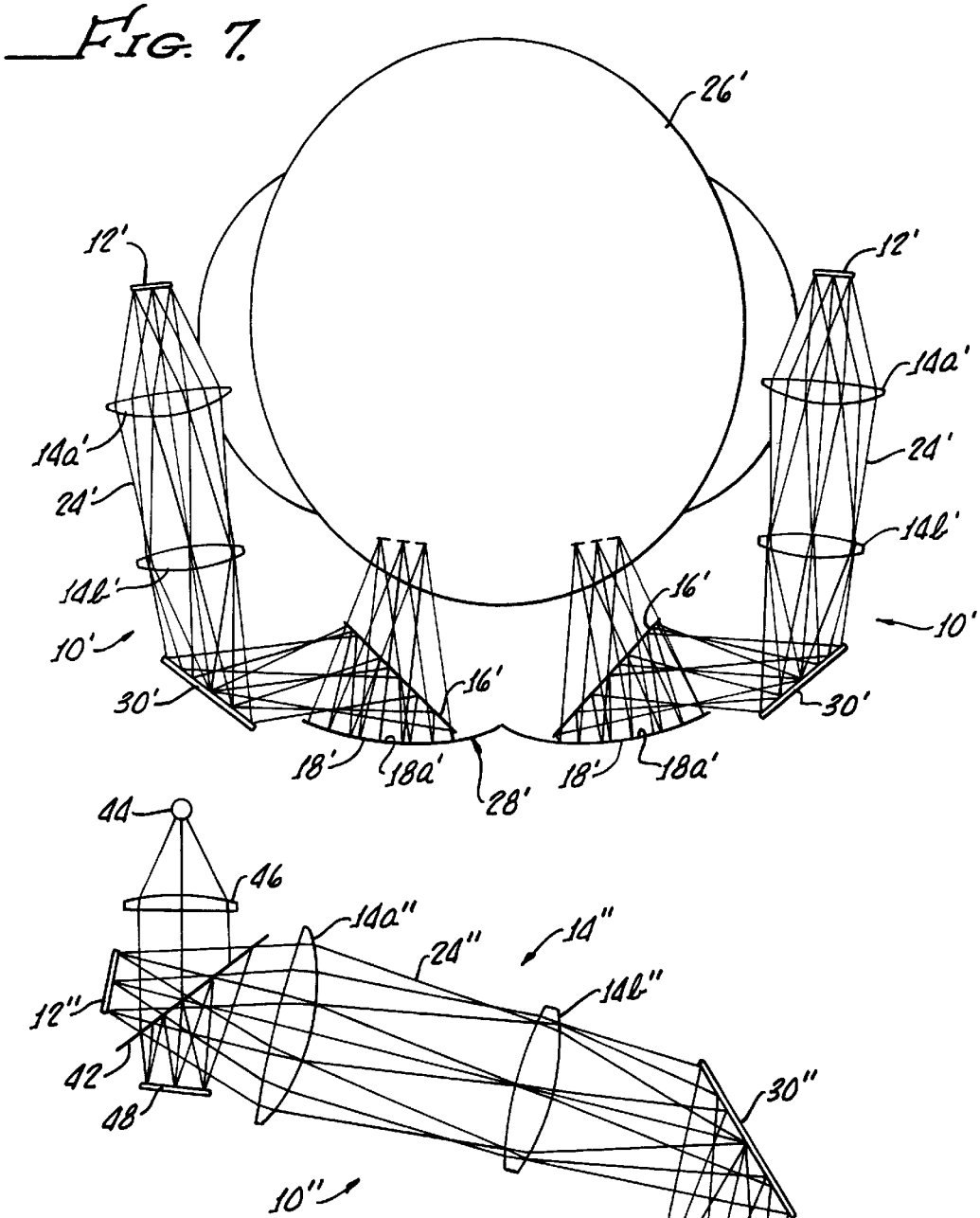
FIG. 7 is a plan view similar to the side elevation view of FIG. 2, showing the embodiment of the invention schematically depicted by FIG. 6 with a projector housing shown in phantom lines and attached to a user's helmet.
Figure 8:
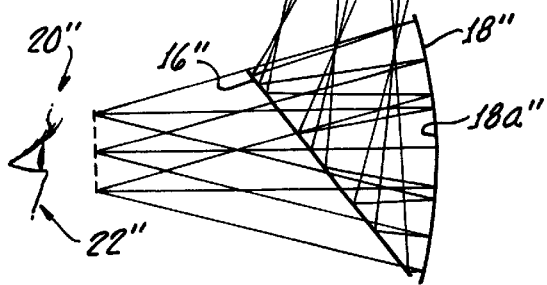
Figure 9:
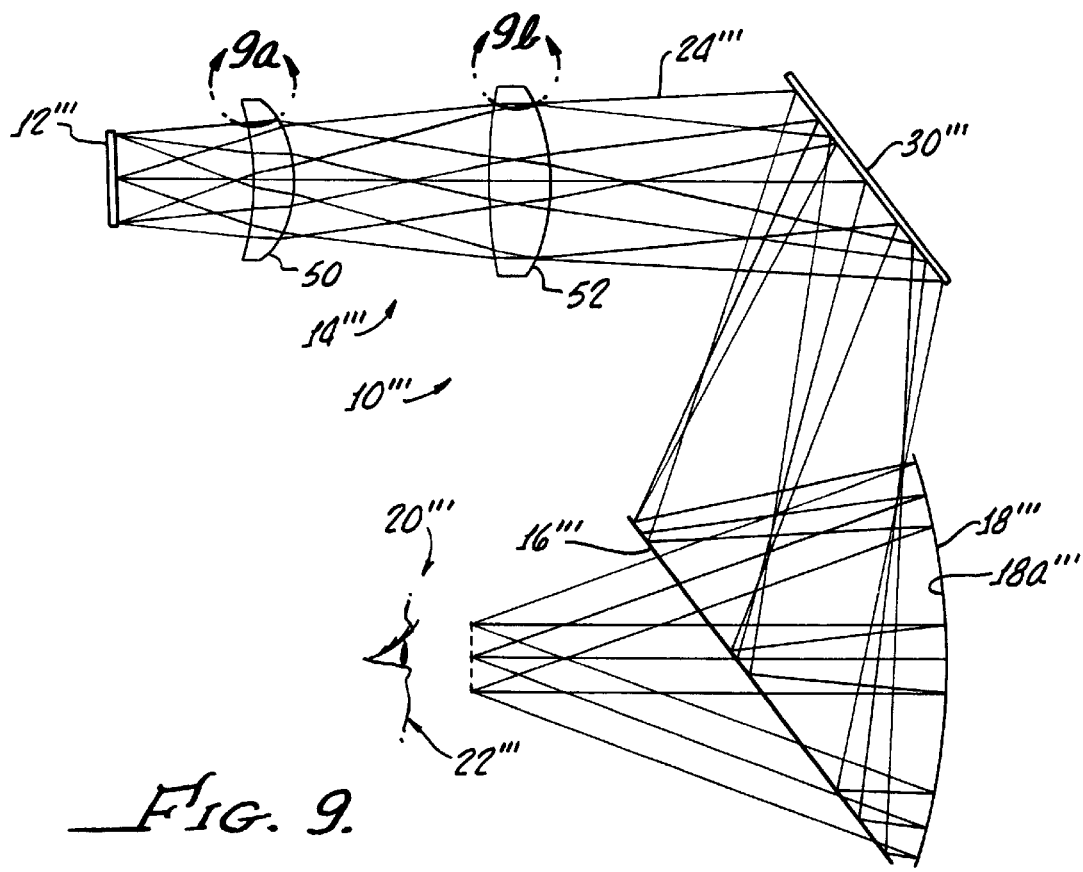
Figure 9A:
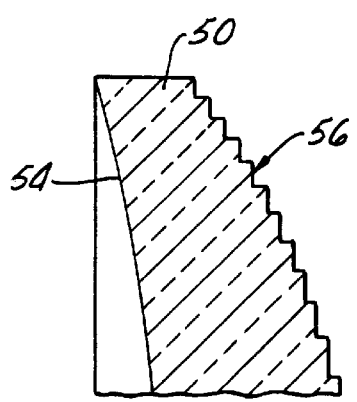
Figure 9B:
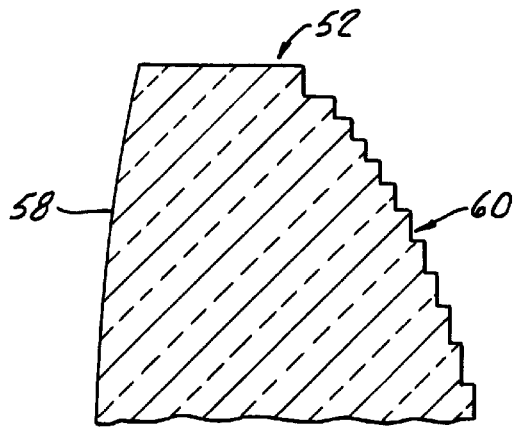

FIG. 8 depicts yet another alternative embodiment of the invention, which is similar to the embodiment seen in FIGS. 6 and 7, but which is additionally equipped with an LED to illuminate the image source (which image source may be a liquid crystal light-valve type), as well as with a second image source; and FIGS. 9, 9a, and 9b show schematically another alternative embodiment of the present invention in which provision is made for correction of chromatic aberrations by use of refraction-diffraction lenses.

DETAILED DESCRIPTION OF THE EXEMPLARY PREFERRED EMBODIMENTS OF THE INVENTION

Figure 1:
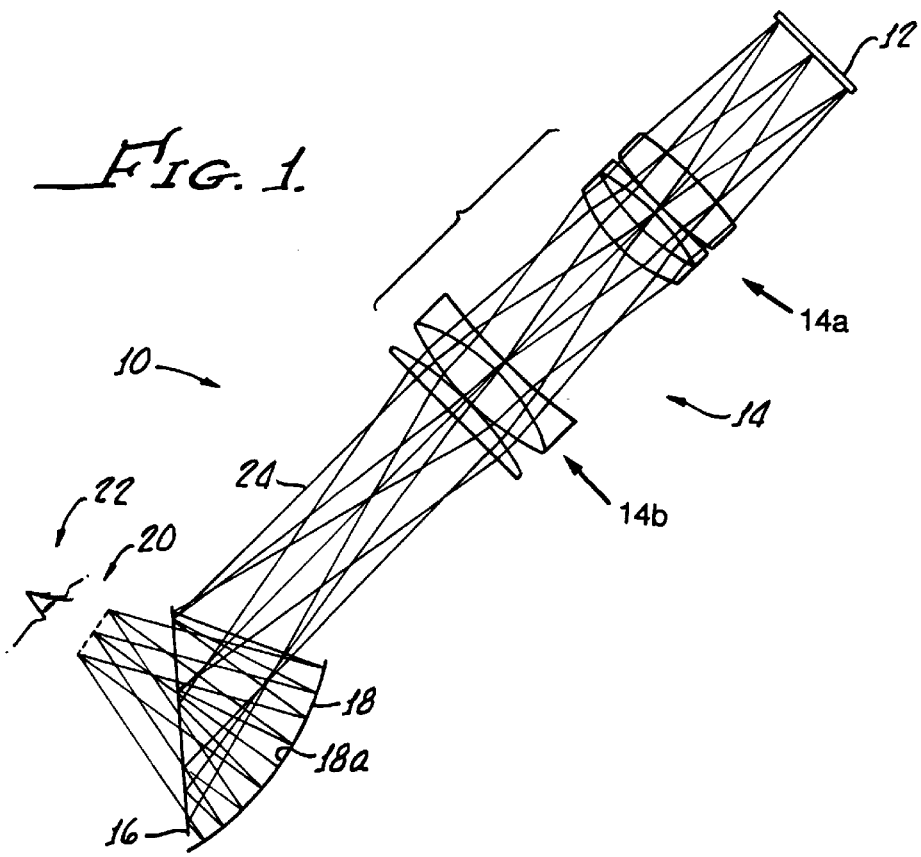

Viewing FIG. 1, a projection display system 10 (which will be seen to be head-mounted) is schematically illustrated, and is provided with ray-tracings in order to illustrate the operation of this display system. Viewing FIG. 1 in greater detail, it is seen that this projection display system 10 includes an image source 12, a relay optics module 14, an angulated wide spectral band beam splitter mirror 16, and a generally spherical transparent and reflective combiner 18. The inner surface configuration of the combiner 18 may alternatively be truly spherical, or may be of generalized spherical shape. The combiner 18 reflects light projected onto the inner surface 18a thereof from the beam splitter mirror 16 back through this mirror 16 and to the eye 20 of an observer 22. Light ray trace lines, generally referenced with the numeral 24 are applied to the schematic illustration of FIG. 1 in order to depict how the eye 20 of the observer 22 receives the image provided by the image source 12. Generally, it will be seen from FIG. 1 that the image projection to the user 22 is an on-axis projection, free of keystoning, asymmetry, and color aberrations which might be caused by an off-axis projection.

More particularly viewing FIG. 1, it will be appreciated that the image source 12 may be a cathode ray tube, or liquid crystal display of the reflective or transmissive type, for example and without limitation. The essential element of the image source 12 is that it is a source of image light for projection, and provide an image by projection, transmission, or reflection of light. Thus, a reflection type of liquid crystal display may be particularly advantageous for use in the present display system because the liquid crystal display will provide an image by reflection of light from another source, such as an easily changed light bulb, the brightness of which is also easily varied to suit the brightness requirements for the image chosen by the user 22.

Further, the relay optics module 14 is seen to have two groups of lens, referenced with the numerals 14a and 14b. The lens group 14a includes three refractive lenses forming a color-corrected lens set, while the lens group 14b includes three refractive lenses similarly forming a color corrected lens set. Examples of materials which may be used in making the color-corrected lenses of the relay optics module 14 are crown glass and flint glass material for correction of chromatic aberration. Thus, the display system seen in FIG. 1 has a wide spectral (color) capability, with good fidelity of the image provided to the user in comparison to the color rendition available at the image source 12. The use of color-corrected lens sets eliminates chromatic aberrations in the image provided to the user 22.

Viewing now FIG. 2, the observer 22 is seen to be wearing a helmet 26 to which the system 10 may be mounted, as will be further explained below. The system 10 is shown schematically in FIG. 2 so that it may be appreciated that the combiner 18 is provided by a visor 28 attached to the helmet 26. That is, the combiner 18 is defined by a portion of the visor 28. Visor 28 may provide a combiner portion 18 in front of each eye of the user 22. Also, the system 10 is mounted low on the side of the helmet 28, with an angulated projection folding mirror 30 being interposed in the path of the light ray traces 24 between the relay optics module 14 and the broad band beam splitter 16. This folding mirror 30 is located to the side and below the eye 20 of the observer 22.

Consequently, it will be seen that the weight of the system 10, or almost all of this weight is carried well below the level of the eye 20 of observer 22. In the schematic presentation seen in FIG. 2, the projection to the user 22 may be seen to include some small elements of off-axis projection. That is, the axis of the relay optics module 14 is not truly parallel with or perpendicular with the axis of light projection from the combiner 18 to the user's eyes. Consequently, a small keystoning or asymmetric distortion of the projected image as perceived by the user 22 may result. Such small elements of off-axis projection may be easily compensated for by slightly tilting either of the first 14a or second 14b lens groups of the relay optics module 14. Alternatively, the correction for off-axis effects my be made by de-centering one of the lens groups 14a or 14b. Still alternatively, such small off-axis correction may be provided by tilting or de-centering the relay optics module relative to the beam splitter 16 or image source 12. However, as will be seen, the physical embodiment of the present projection display system is virtually free of such off-axis projection effects.

Figure 2:
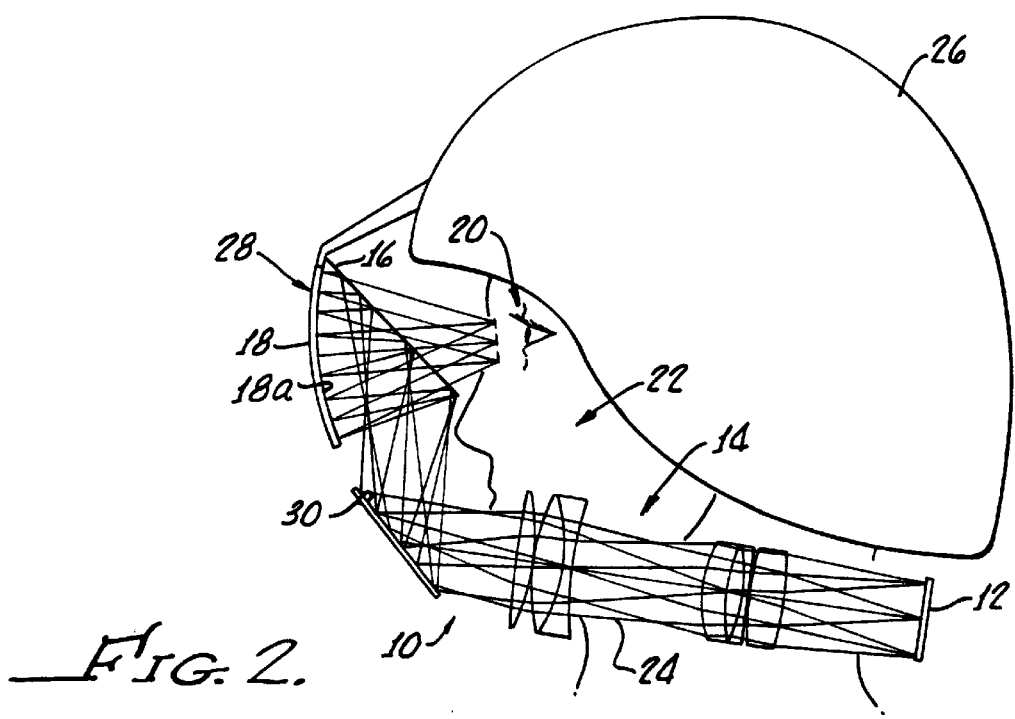
Figure 3:
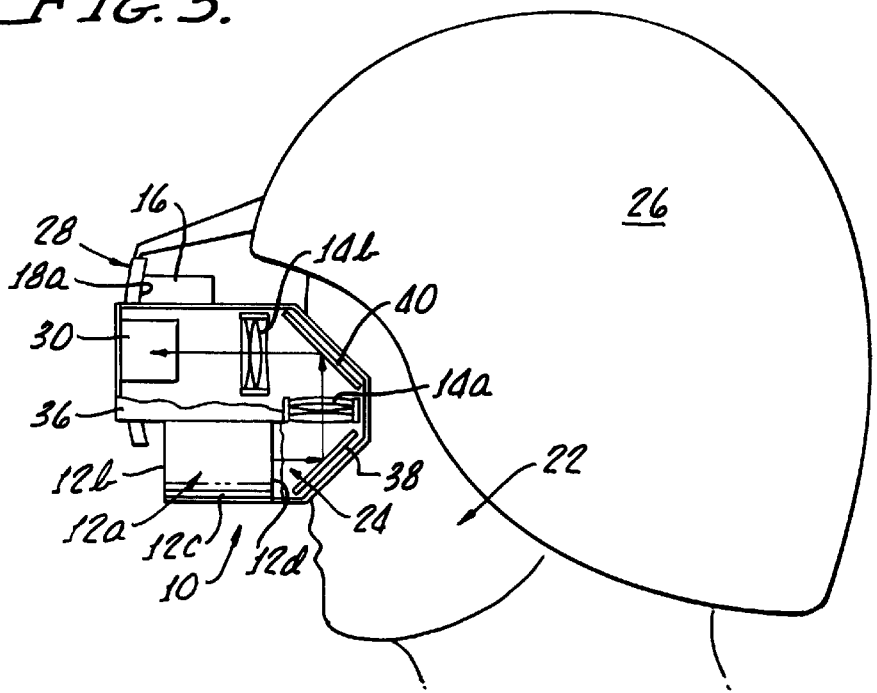
Figure 4:
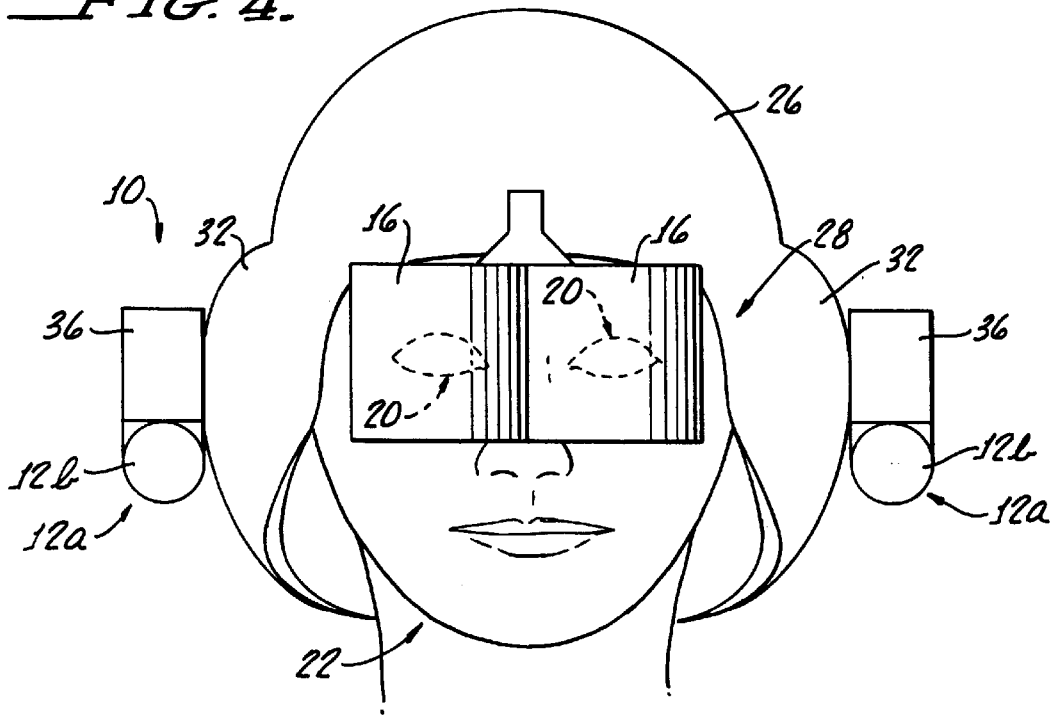

Viewing now FIGS. 3–5 in conjunction, a more fully developed physical embodiment of the projection display system 10 is shown. This embodiment of the invention has particular utility as an image intensifier display also simultaneously allowing natural vision of the outside world through a transparent combiner. Another use for this embodiment is as an eye-safe goggle/display allowing the user to receive a projection of imagery (including, for example, an image of the outside world) while still protecting the user's eyes from harm. For example, the visor of the helmet (the combiner) could be opaque to protect the user's eyes from the light of offensive laser weapons and from nuclear events. This particular embodiment allows the user to combine night vision (which imagery is provided as a projection from the combiner 18), with natural vision of the outside world through the transparent combiner 18, if desired. This projection display system 10 includes helmet 26 having a pair of opposite laterally-extending portions 32. Forwardly from each of these laterally extending portions 32 of the helmet 26 extends a respective left or right one of a pair of bracket members referenced with the numeral 34. Carried on respective ones of the pair of bracket members 34 are a pair of projector housings 36. These projector housings 36 also house the image source 12 and relay optics module 14 which were seen in FIGS. 1 and 2. In this case, the image source 12 takes the form of an image intensifier (referenced with the numeral 12a in FIG. 3).

The image intensifier 12a includes an objective lens 12b (best seen in FIG. 4), and an image intensifier tube 12c. The image intensifier tube 12c includes a rear image surface 12d (seen in FIG. 3) at which an intensified image of a night-time scene is presented in phosphorescent yellow-green light. Those ordinarily skilled in the pertinent arts will well understand that the image intensifier tube 12c is an electro-optical device which is responsive to light in the near-infrared portion of the spectrum. This light is invisible to the human eye, but is rich in the night time sky because of the light from the stars. Hence, early image intensifier devices came to be known as "star light" scopes. The image intensifier 12a is thus conventional, and will not be further described.

The visor 28 of the helmet 26 includes a pair of spherical or generalized spherical combiner portions 18, one disposed in front of each one of the user's pair of eyes. Disposed between each of the combiner portions 18 and the respective one of the user's eyes 20 is a respective one of a pair of beam splitter mirrors 16. These beam splitter mirrors 16 are angulated to receive the light projected laterally from a projection folding mirror 30 dispose at the projector housings 36 and angulated inwardly and slightly to the rear toward the beam splitter mirrors 16. The angulation to the rear of the projection fold mirrors 30 is for convenience of physical arrangement only, and the projection between mirror 30 and beam splitter 16 may be purely lateral of the user 22. Thus, is seen that the beam splitter mirrors 16 are angulated outwardly to receive the projected image light from the projector housings 36, as is represented by the arrows 24.

Viewing FIG. 3, it is seen that the projector system seen in FIG. 2 has been made more compact by introducing a first folding mirror 38 between the image source 12a and the relay optics lens group 14a. A second folding mirror 40 is interposed between the relay optics first lens group 14a and the second lens group 14b. Thus, it is seen that the image source 12a is disposed to project image light (arrows 24) rearwardly, while the first folding mirror directs this image light upwardly to the second folding mirror for direction forwardly. That is, in side view as seen in FIG. 3, the projector 36 is arranged with a C-shaped optical path having the image source 12a in a lower leg of this optical path, and the upper leg of the path at eye level for the user 22. The second lens group 14b is generally at the eye level for the user 22, so that the projection folding mirror 30 is located generally at the level of the user's eyes and just slightly outwardly thereof. This level for the projection folding mirrors 30 eliminates the need for compound angulations of the beam splitter mirror and projection folding mirror as were explained in connection with the schematic illustration of FIG. 2. Still the projector 36 has a low center of gravity because all of the image source 12a, first fold mirror 38, and first lens group 14a are below the eye level of the user 22.

Additionally, the display system illustrated in FIGS. 3–5 provides a low moment of inertia both with respect to the user 22 turning the head from side to side about a vertical (azimuthal) axis, and also with respect to the up and down (i.e., nodding and head raising) motions of the head about a horizontal elevational axis. The present display system has a low moment of inertia about the vertical axis because the optical system used by the projectors 36 may be much simpler and lighter with fewer lenses than required by previous head-mounted projection displays. User fatigue is reduced because the projection display system 10 has a low center of gravity. The user does not get the impression that the helmet is top heavy, and that the neck muscles must be consciously used to prevent the helmet and display from tipping to the side. The balance of the projectors 36 and other components of the display system is generally at a level below the eye level of the user 22 so that only the weight of the system is noticeable, and not a top heavy sensation acting on the head. The weight of the system is considerably reduced in comparison to previous head mounted display systems because of the simplicity and reduced weight of the lens systems.

With respect to nodding or head raising motions (i.e., about a horizontal or elevational axis), the side elevation view of FIG. 3 illustrates that the mass of the display system 10 is mostly below the eye level of the user 22, and is located at about the level of the lower jaw where the effective pivot axis is located between the spine and skull. Consequently, movements of the head about this elevational axis simply pivots the projection system 10 about an axis close to the projector housing 36 with a low moment of inertia, and without an arcuate motion of this projector housing at the end of a long lever arm with attendant high moment of inertia. This type of long lever arm and high moment of inertia are exhibited by HMD's which dispose the projection apparatus atop the user's helmet. The beam splitter 16 is a comparatively light-weight part so that its positioning in front of the user's eyes does not create much of a moment of inertia about either the vertical or horizontal axis. Visor 28 weighs about the same as a conventional visor so that this part of the display system does not increase the moments of inertia experienced by the user 22 in comparison to a standard helmet with visor.

FIGS. 6 and 7 schematically show developments of an alternative embodiment of the present projection display system similar to FIGS. 1 and 2, but with FIG. 7 offering a plan view rather than the side elevation view used in FIG. 2. In FIG. 7, the projector housing is shown in phantom lines to better depict salient features of the display system. In order to obtain reference numerals for use in describing this embodiment, features which are the same as or which are analogous in structure or function to, features described above are referenced with the same numeral used above and with a prime (') added. The alternative embodiment developed in FIGS. 6 and 7 offers an even lighter weight and even lower moment of inertia about both the vertical and horizontal axes.

FIGS. 6 and 7 depict an alternative embodiment in which the relay optics module 14 merely includes a much simplified two-lens group. That is, the function performed by the first lens group 14a of FIG. 1 and 2 is now performed by a single lens, referenced with the numeral 14a'. Similarly, a single lens 14b' serves the function of the second lens group. Accordingly, it will be appreciated that chromatic correction has not been provided in the alternative embodiment of the invention seen in FIGS. 6 and 7. However, this alternative embodiment has the advantages of lighter weight, lower moments of inertia about the vertical and horizontal axes, and much reduced costs because of the simplified optical system. This alternative embodiment of the invention is very much suitable for use in instances where a full color image need not be projected for the user. These instances included projection of a monochrome image or of a phosphorescent yellow-green night vision image, for example. This embodiment may also be uses for low-cost virtual-reality image projection systems for training uses and for the consumer, in which a computerized simulation is sufficient for the user without full color rendition. This alternative use of the display system could employ an opaque visor to form the combiner surfaces, and might be used for training of pilots or by consumers for game playing, such as flight simulation, for example.

FIG. 8 depicts another alternative embodiment of the invention. In order to obtain reference numerals for use in describing this embodiment, features which are the same as or which are analogous in structure or function to, features described above are referenced with the same numeral used above and with a double prime (") added. Viewing FIG. 8, the projection display 10" includes an image source 12", relay optics module 14", beam splitter 16", and combiner 18". In this embodiment, the image source 12" is of the liquid crystal light-valve type. That is, the image source is reflective. In order to provide illumination for the image provided by the image source 12", an angulated beam splitter mirror 42 is provided. Laterally of the ray traces 24 from the image source 12", an light emitting diode (LED) 44 is disposed at the focus of a condenser lens 46. The LED 44 provides light which is reflected from the beam splitter mirror 42 onto the image source 12". From the image source 12", the light (now carrying the image provided by the source 12") is reflected back to and through the beam splitter 42. As before, the light from the image source 12" is conducted through the relay optics module 14" and to the user 22.

An advantage of the embodiment seen in FIG. 8 is that a second image source 48 may be provides oppositely to the LED 46. In this case, the image source 48 may be illuminated by light from LED 46 which passes first through the beam splitter 42, is reflected from the light-valve type image source 48, and is reflected along the lines 24" by the beam splitter 42. The image source 48 need not be of the light-valve type. However, it will be recognized that this embodiment is particularly useful for sensor fusion, that is, for combining an image from sensors (such as symbology, graphical indicia, and characters, for example) with an image of the outside would. The user 22 will see the images superimposed and focused at infinity so that visual focus does not need to be shifted from the outside world in order to visually perceive the symbology, graphicals and other characters.

FIG. 9 schematically depicts yet another alternative embodiment of the invention having very light weight, low center of gravity, and reduced moments of inertia. In order to obtain reference numerals for use in describing this embodiment, features which are the same as or which are analogous in structure or function to, features described above are referenced with the same numeral used above and with a triple prime ("'") added. This embodiment benefits from a reduced weight and moment of inertia for the relay optics module 14''' by the use of refractive-diffractive (rather than only refractive) optical elements. As is seen in FIG. 9, the projection display system 10''' includes an image source 12''', a relay optics module 14''', a projection folding mirror 30''', a beam splitter 16''', and a combiner 18'''. However, the relay optics module 14''' includes only two lens groups, which are of the refractive-diffractive type rather than merely being refractive lenses. That is, the relay optics module 14''' includes a first refractive-diffractive lens 50 which transmits the image from image source 12''' to a second refractive-diffractive lens 52.

FIGS. 9a and 9b provide greatly enlarged fragmentary views of these refractive-diffractive lenses. The first refractive-diffractive lens 50 includes a lens with a curved refractive surface 54 confronting the image source 12'''. The lens 50 also includes an opposite etched or stair-stepped diffractive surface 56. Similarly, second refractive-diffractive lens 52 includes a lens with a curved refractive surface 58 confronting the image source 12'''. The lens 52 also includes an opposite etched or stair-stepped diffractive surface 60. As a result of requiring only the two lenses 50 and 52, the relay optics module 14''' may be made considerably lighter in weight than conventional lens groups. This embodiment of the invention has the advantage of allowing chromatic correction of the projected image so that a good color fidelity is achieved, at a weight for the relay optics module 14 (generally considered) which is about the same as that of the embodiment seen in FIGS. 6 and 7.

While the present invention has been depicted, described, and is defined by reference to particularly preferred embodiments of the invention, such reference does not imply a limitation on the invention, and no such limitation is to be inferred. The invention is capable of considerable modification, alteration, and equivalents in form and function, as will occur to those ordinarily skilled in the pertinent arts. For example, it is apparent that an important objective of the present invention is to provide a head mounted projection display system which provides good quality of image rendition while also being light in weight, having a low center of gravity, and providing low moments of inertia about the vertical and horizontal axes of greatest interest. To this end, some or all of the lenses and other optical elements of the projection display system can be made of plastic.

That is, lenses, mirrors, and beam splitters necessary for the apparatus may be formed of light-weight plastic rather than the more traditional and much heavier glass. Even when implemented with plastic lenses, the present invention provides an outstanding optical quality because of not using off-axis projection, but having a beam splitter and on-axis projection. However, the image brightness achieved with the present invention is generally better than previous on-axis projection systems in part because the present invention minimizes the number of lenses, mirrors, and filters interposed between the image source and the eye of the viewer. Accordingly, the depicted and described preferred embodiments of the invention are exemplary only, and are not exhaustive of the scope of the invention. Consequently, the invention is intended to be limited only by the spirit and scope of the appended claims, giving full cognizance to equivalents in all respects.

What is claimed is:

1. An image-projection display system carried upon a headgear to be worn on the head of a user, the display system having improved image quality and a low center of gravity on the user's head with low moments of inertia about both a vertical azimuthal axis and a horizontal elevational axis, said display system comprising:

an image source for providing an image to be projected to the user, said image source providing light for forming said image;

a beam splitter disposed in front of an eye of the user for receiving the projected light from said relay optics module and reflecting this light away from the eye of the user;

a combiner disposed in front of both said user's eye and said beam splitter and upon which said light reflected from said beam splitter is projected to be reflected from said combiner back through said beam splitter to the user's eye;

said image source disposed to one side of the user's head and below the level of the user's eye;

a light source for illuminating said image source, said image source being a reflective light-valve type of liquid crystal display;

a second beam splitter interposed optically between said light source and said image source, said light source being laterally disposed with respect to said image source, and said second beam splitter being angulated to reflect light from said light source to said image source, said second beam splitter also allowing light reflected from said image source to pass therethrough to said user; and a second image source disposed laterally of said image source and opposite to said light source, said second beam splitter reflecting light from said second image source to said user.

2. The display system of claim 1 wherein said second beam splitter also transmits light from said light source to said second image source to illuminate the latter.

3. An image-projecting display system carried upon a helmet worn by a user and provided with a visor disposed in front of the user's eyes, the display system having improved image quality, and the display system and helmet together having a low center of gravity on the user's head with low moments or inertia about both a vertical azimuthal axis and a horizontal elevational axis, said display system comprising:

said helmet including a laterally projecting portion generally below eye level of the user, said display system including a projector housing mounting to said laterally projecting portion of said helmet laterally of the user, said projector housing receiving therein an image source and a relay optics module;

said image source being disposed below eye level and providing light forming an image to be projected to the user;

said relay optics module receiving said light from said image source and having lenses for projecting said light;

said visor defining a combiner portion disposed in front of the eye of the user, said combiner portion having an inner surface which is concave rearwardly toward the user;

an angulated beam splitter interposed between said visor and the eye of the user, said beam splitter being angulated about a generally vertical axis to reflect light received laterally of the user forwardly and away from the user toward said combiner portion inner surface of said visor, said combiner inner surface reflecting said light back through said beam splitter to the eye of the user forming a virtual image for the user;

said relay optics module defining an optical path which is generally C-shaped in side elevation view, said image source providing said light directed rearwardly relative to said user, and said C-shaped optical path extending from said image source below the level of the eye of the user up to eye level;

wherein said projector housing includes a first fold mirror interposed optically between said image source and a first lens of said relay optics module;

said first fold mirror being located generally at eye level, whereby said first fold mirror reflects light from said image source to said beam splitter laterally of said user to said beam splitter;

wherein said relay optics module includes said first lens and a second lens, said relay optics module including a second fold mirror interposed optically between said first lens and said second lens;

further including a second image source providing light forming a second image, an angulated second beam splitter disposed to transmit both light from said image source and light from said second image source to said relay optics module;

wherein said image source includes a light emitting diode (LED); and wherein said LED is disposed laterally of said image source, said second beam splitter being interposed optically between said LED and said image source to both reflect light from said LED to said image source and to transmit light reflected from said image source to said relay optics module, said second image source being disposed oppositely to said LED, and said second beam splitter being disposed both to transmit light from said LED to said second image source and to reflect light reflected from said second image source to said relay optics module.

* * * * *